Figure 1:
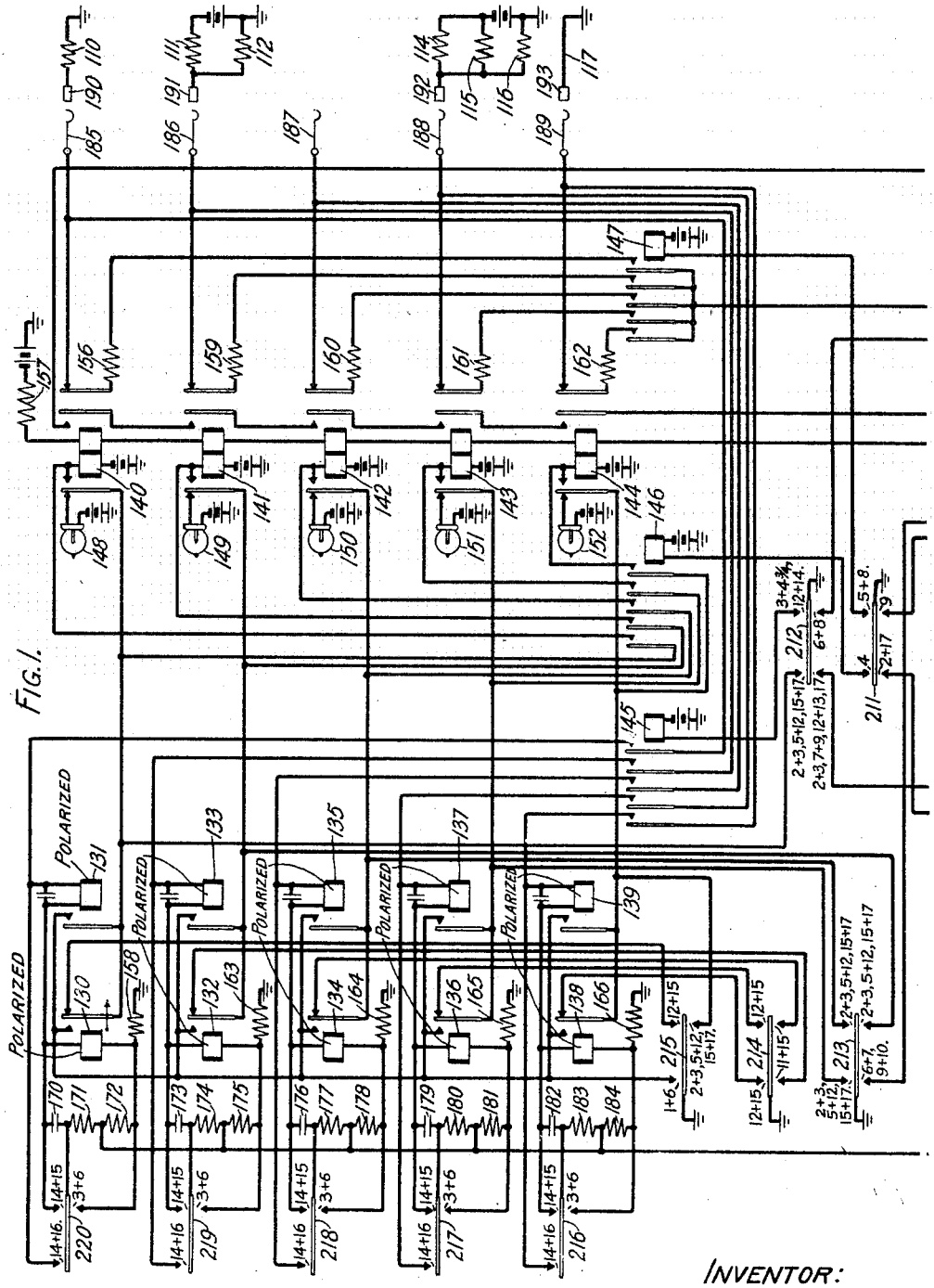

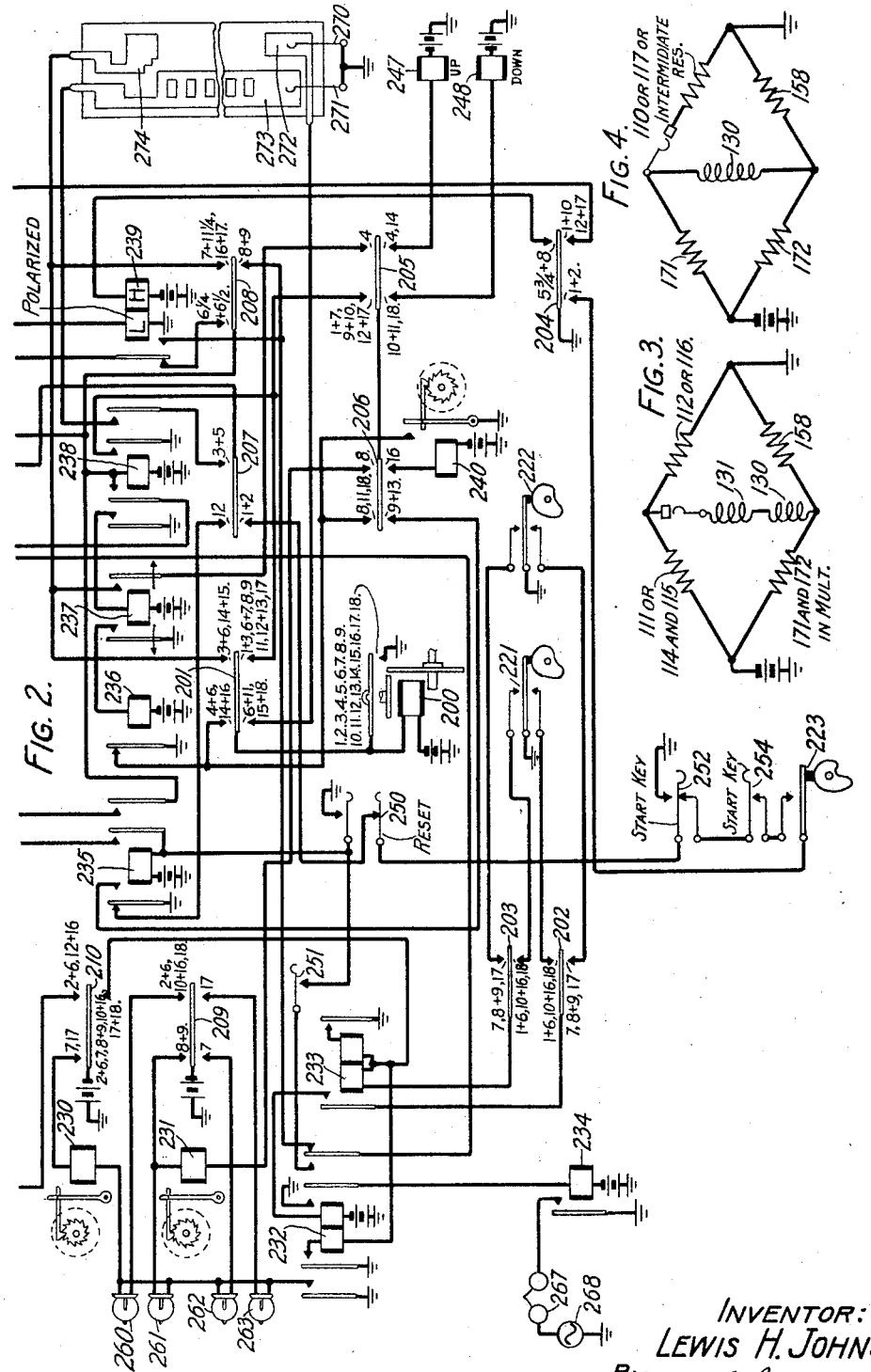

Patented Oct. 8, 1929

1,730,977

UNITED STATES PATENT OFFICE

LEWIS H. JOHNSON, OF MADISON, NEW JERSEY, ASSIGNOR TO WESTERN ELECTRIC COMPANY, INCORPORATED, OF NEW YORK, N. Y., A CORPORATION OF NEW YORK

ELECTRICAL TESTING SYSTEM

Application filed October 18, 1927. Serial No. 226,883.

The present invention relates to a testing system in an automatic telephone exchange. More specifically it relates to an automatically operable testing device for progressively testing apparatus having a plurality of different electrical characteristics. The testing device comprises Wheatstone bridge circuits variably formed by the testing device and the apparatus tested for locating apparatus having certain characteristics.

The electrical condition of telephone exchange switch bank terminals varies in accordance with the apparatus connected thereto. This is particularly true of terminals connected to line apparatus since it is necessary to differentiate between lines connected to subscribers' stations, lines connected to private branch exchanges, etc. The apparatus connected to such terminals further includes the apparatus of selector switches temporarily associated therewith. The apparatus of a selector switch for selecting termianls of such a bank must be adjusted within close limits. If this apparatus becomes out of adjustment through careless maintenance or normal wear, trouble may be encountered from double connections, that is, more than one switch may be automatically associated with the same terminals. Double connections may also occur from a change in the electrical condition of the apparatus connected to a terminal. This may be caused by poor adjustments of apparatus or a change in the resistance of apparatus which may be caused by dirt, high potential etc. A wide variation in potential may therefore exist on the various terminals of a switch bank. A testing system for rapidly supervising electrical connections associated with such terminals is valuable in maintaining proper service conditions.

One embodiment of the present invention comprises a number of testing devices equal to the number of banks of terminals to be tested, a movable brush associated with each testing device, and a common drive shaft for driving said brushes simultaneously over the terminals of a plurality of terminal banks. Individual to each brush is apparatus for completing the formation of a Wheatstone bridge circuit when associated with various apparatus combinations which may be encountered on the bank terminals. The control of the drive shaft is governed by any of the plurality of Wheatstone bridge testing devices. A signal is associated with each brush for indicating one or more banks of terminals in which an electrical condition of certain characteristics is encountered. Other indicating apparatus is commonly associated with the plurality of individual testing units for indicating various types of conditions encountered.

In accordance with the present invention the drive shaft carrying the testing brushes is continuously driven in an upward movement stopping only when an electrical condition of certain characteristic is encountered. The condition of test is automatically changed for a plurality of tests. During one test the balance of the Wheatstone bridge arrests the upward movement of the drive shaft. During another test the unbalance of the Wheatstone bridge arrests the upward movement of the drive shaft. When the brushes reach the top terminal of the banks, the drive shaft is automatically returned to its normal position to be again driven upward over the bank terminals after a predetermined time interval.

The illustrated embodiment Fig. 1 discloses five testing units each associated with a brush attached to a common drive shaft. A plurality of terminals in the right portion of Fig. 1 illustrates examples of electrical conditions encountered by the testing circuits. Resistance networks are shown in the left portion of Fig. 1 for the formation of a plurality of Wheatstone bridge circuits.

Fig. 2 includes apparatus and circuits commonly associated with the five individual testing circuits for controlling the movements of the testing circuits and for the operation of signaling apparatus associated therewith.

Figs. 3 and 4 illustrate Wheatstone bridge combinations formed by any of the five testing units and the apparatus tested.

The means employed for driving the brushes over the terminals of the switch bank as disclosed for this invention is the same as shown and described in Patent 1,123,696, issued to E. B. Craft and J. M. Reynolds, January 5, 1915. This switch has a vertically disposed switch shaft provided with a plurality of sets of brushes, each brush set having access to a bank of terminals. Only one brush of each brush set is required for the operation of this invention. For driving the switch shaft upward, an updrive magnet is provided which when energized presses the switch shaft against a constantly driven power drum. For driving the switch shaft to its normal position, a downdrive switch magnet is provided that when energized presses the switch shaft against a second constantly driven power drum. The brushes shown in the foregoing patent are arranged to be individually tripped or selected for associating anyone of the brush sets with a particular bank. For the operation of this invention all brushes are permanently tripped in order to simultaneously associate a plurality of brushes with a plurality of switch bank terminals. The commutators provided are similar to those disclosed in the aforementioned patent. Brushes are driven over the commutator surface by the vertically disposed switch shaft hereinbefore mentioned for driving the brushes having access to the bank terminals. A sequence switch partly shown in Fig. 1 and partly in Fig. 2 is of the ordinary type well known in the art. The remaining apparatus such as relays, resistances, interrupters, and lamps are well known in the art and it is believed need no further description.

It is believed that the invention will be better understood from the following detailed description taken together with the illustrated embodiments:

Let it be assumed that the testing circuits (Fig. 1) and controlling circuits (Figs. 1 and 2) are associated with a frame of line terminals divided into a plurality of banks. The apparatus or electrical conditions shown in Fig. 1 connected to terminals 190 to 193 inclusive, may be interspersed throughout all of the terminal banks. Assuming that this frame of terminals is associated with telephone lines, the condition associated with terminal 190 represents an idle line. The resistance 110 may be of different values since one value is used for a subscriber's station line and another for a PBX line. The apparatus associated with terminal 191 represents a line associated with a terminating connector switch during a telephone conversation. The resistance 112 is variable depending upon the line associated with the connector switch. The condition shown at terminal 192 represents two terminating connector switches associated with the same line which is known as a double connection. The condition associated with terminal 193 represents a faulty ground which has shunted the resistance normally connected to this terminal. This condition varies greatly. The resistance such as 110 may be partly shunted by a dirt resistance to ground. This dirt resistance may be of any value.

*Double connection test*

A test of the electrically connected apparatus associated with a plurality of banks of terminals is started by the operation of start key 254 or start key 252. If the start key 254 is operated, the testing circuit is automatically started each time that cam 204 arrives in position 1, and the continuously driven interrupter 223 closes its contact. The interrupter 223 may be regulated to operate at predetermined time intervals. If start key 252 is operated and released, the testing circuit tests all the terminals in the terminal banks for a plurality of conditions that might be present and returns to its normal position if no unstandard conditions are found.

Let it be assumed that the start key 252 is operated for a single operation of the testing circuit. A circuit is thus established for the operation of relays 140 to 144 inclusive, from ground through the contact of key 252, normal contact of key 250, lower contact of cam 207, right winding of relays 140 to 144, resistance 157 to battery. The operation of these relays establishes the series circuit for the operation of relay 238 from ground through the right lower contact of cam 204, right inner contacts of relays 140 to 144 inclusive, winding of relay 238 to battery. A circuit is thus established to operate relay 237 from ground through the left outer contact of relay 238. The operation of relay 237 establishes a circuit through its left contact to operate relay 236. The operation of relay 238 further establishes a circuit to energize the sequence switch magnet 200. This may be traced from battery through the winding of magnet 200, right lower contact of cam 201, to ground through the right inner contact of relay 238. Since the right lower contact of cam 201 maintains this circuit established through sequence switch positions 1 to 3, the magnet is energized to drive the sequence switch cams into position 4. It will be noted that the original energizing circuit for relays 140 to 144 is opened after position 2 by cam 207. Locking circuits are established for relays 140 to 144, in sequence switch positions 2 and 3. These locking circuits may be traced from battery through the left windings and contacts of these relays to ground through contacts of cams 212, 213 and 215. After the sequence switch cams pass into positions 3 and 4, these five relays are held operated from battery through resistance 157, right windings of relays 140 to 144, right upper contact of cam 207, right outer contact of relay 238, commutator 273, brush 271 to ground.

During the rotation of the sequence switch cams into position 4, a circuit is established for relay 145 from battery through its winding to ground through the right upper contact of cam 212 in position 3 to 4¾. The operation of this relay connects brushes 185 to 189 inclusive, through the relay contacts to the windings of relays 130 to 139 inclusive, each brush being associated with a pair of relays. In sequence switch position 4 a circuit is established for operating relay 146 from battery through its winding to ground through the left upper contact of cam 211. The operation of relay 146 connects the locking windings of relays 140 to 144 to the armature of the polarized relays associated with the brushes 185 and 189. The sequence switch cams 216 to 220 and 210 also in position 4, from the resistances of different testing units into networks for establishing a potential at each network equal to that found upon a bank terminal associated with a double connection.

The magnet 247 for driving the brushes over the bank terminals is energized in sequence switch position 4 from battery through its winding, right lower and left upper contacts of cam 205 to ground through the right inner contact of relay 238. As the brushes 185 to 189 are driven in an upward movement over the bank terminals, Wheatstone bridge circuits are formed as shown in Fig. 3. This Wheatstone bridge circuit is formed for testing the bank terminals to locate terminals associated with more than one connector circuit, such as shown connected to terminal 192. Two connecting circuits associated with a line terminal impress upon the terminal a potential that may be computed from the values given to resistances 114, 115 and 116. These values are different for different connector circuits and need not be stated for the practice of this invention. The remaining legs of the Wheatstone bridge may be computed for numerous resistance values.

Referring now to the bridge circuit of Fig. 3, it will be noted that resistances 114 and 115 form one leg of the bridge and resistance 116 a second leg. If the remaining resistance values of the Wheatstone bridge located in the testing circuit are properly computed, a potential may be impressed upon the brush equal to the potential of the terminal associated with a double connection. If the testing circuit resistances are computed in this manner, it is apparent that no current will flow through the relays 130 and 131 or similar relays in the testing circuits 132 to 139 forming such a bridge circuit when associated with electrically connected apparatus such as shown at terminal 192. The testing circuit is arranged so that this Wheatstone bridge circuit must be constantly maintained out of balance, when associated with all electrically connected apparatus, except the electrically connected apparatus such as shown for a double connection at terminal 192.

In the formation of this testing circuit for commercial use it was practical to use two polarized relays in each bridge circuit. For the double connection test a single neutral relay could be used to replace the two polarized relays. This neutral relay would operate from current through its winding in either direction. A single polarized relay with a balanced armature operable in either direction could also be used in the bridge circuits.

It will be remembered that the holding circuit for relays 140 to 144 extended through commutator 273 to ground. Brushes 185 to 189 and 271 are driven upwardly by the common shaft. Insulated portions of the commutator are thus brought into contact with brush 271. The brush 271 is associated with the insulated portion of commutator 273 at the same time that each of brushes 185 to 189 are associated with a terminal. Therefore at this time, the circuit for holding relays 140 to 144 is open. Any potential within certain limits below or above the potential of a double connection will unbalance the bridge circuits. Considering Fig. 3 as the bridge circuit unbalanced, the result will be a current flow in either one direction or the other through the relays 130 and 131. Relays 130 and 131 are polarized in opposite directions. Therefore a current flow in either direction will operate one or the other of these relays. The operation of either relay 130 or 131 establishes a locking circuit for relay 140, from battery through its left winding and contact, contact of the operated relay either 130 or 131 to ground through cam 215. Each circuit including relays 132 to 139 and relays 141 to 144 are organized in the same manner as the circuit including relays 130, 131 and 140. Let it be assumed that a double connection such as diagrammatically shown at terminal 192 has been located by one of the brushes 185 to 189 and that one of the bridge circuits has been balanced. If anyone of the five bridge circuits are balanced, the polarized relays associated with the balanced bridge circuit are maintained in a non-operated position. Since the energizing circuit for relays 140 to 144 is open at commutator 273 and no locking circuit is established through the contacts of the polarized relays any one of the relays 140, 141, 142, 143 or 144 that may be associated with the balanced bridge circuit will release. The release of any one of the relays 140 to 144 opens the energizing circuit for relay 238. Since the latter relay maintains the energizing circuit for the updrive magnet, this magnet becomes deenergized and arrests the upward movement of the brushes.

The release of relay 238 further opens the energizing circuit for relay 237 and the release of relay 237 opens the energizing circuit for relay 236. The release of relay 236 establishes an energizing circuit for the sequence switch magnet 200 from ground through the normal contact of relay 236, left upper contact of cam 201, magnet 200 to battery. Since the left upper contact of cam 201 remains closed in positions 4 to 6, the sequence switch is driven from position 4 into position 7.

If only one of the relays 140 to 144 is released to cause the advance of the sequence switch to position 7, the other four relays remain operated. A locking circuit for these four relays is established in position 4 through the contacts of the polarized relays that are operated by the unbalanced bridge condition. In positions 5 to 7 these four relays are locked to contacts of cams 212, 213 and 215. The one relay, of the five relays 140 to 144, that has released establishes a circuit for a lamp associated with the back contact of said relay for indicating the location of the double connection found. The circuit established for this lamp is extended to ground through the contact of cams 212, 213 or 215 depending upon the relay released. This is the same circuit as used for locking the relays which have not released.

The rotation of the sequence switch from position 4 to position 7 further opens the energizing circuits for relays 145 and 146. It will be noted, however, that relay 145 is not released until the sequence switch contact passes out of position 4¾. This is done in order that a circuit may be maintained between the brushes 185 to 189 and the polarized relays 130 to 139, until the sequence switch cams 212, 213 and 215 arrive in position 5. The holding circuits for relays 140 and 144 would otherwise be opened before the sequence switch rotates out of position 4.

During the rotation of the sequence switch, relay 147 is energized in position 5 from ground at cam 211. Let it be assumed that relay 143 is the relay that has been released because a double connection was found in the bank of terminals tested by the brush 188 associated therewith. The operation of relay 147 establishes a circuit from ground through the left winding of relay 239, fourth left contact of relay 147, resistance 161, right outer contact of relay 143, brush 188, contact 192 to battery through resistances 114, 115 and to ground through resistance 116. The potential connected to terminal 192 by this double connection combination of apparatus is not sufficient to operate relay 239. The association of the left winding of relay 239 and resistance 161 with contact 192 neutralizes the effect of the double connection. The potential of a terminal connected with a double connection is thus reduced to the potential of a terminal connected to a single connecting switch. This circuit is allowed to remain connected to the terminal until the double connection is removed, in order that no further trouble will be encountered from the double connection. Resistances 156 to 162 inclusive are individually associated with the brushes 185 to 189 in order that the normal condition may be reproduced at more than one terminal at the same time. This may be necessary when a plurality of double connections are simultaneously encountered by the testing circuits.

In position 5¾ of the sequence switch, a circuit is established from battery through the right winding of relay 239 to ground at the upper contact of cam 204. The current flow through the left and right windings are in opposite directions and for this test relay 239 remains in a non-operated position. As the sequence switch rotates into position 6¼, a circuit is established to operate relay 238 from ground through the right lower contact of cam 212, left normal contact of relay 239, left upper contact of cam 208, winding of relay 238 to battery. The operation of relay 238 establishes a locking circuit for itself through its left inner contact, to ground through the left lower contact of cam 213. This relay thus remains operated when the sequence switch arrives in position 7. A circuit is established in position 7 to rotate the sequence switch into position 8, from ground through the right inner contact of relay 138, right lower contact of cam 201, to battery through the winding of sequence switch magnet 200. The rotation of the sequence switch from position 7 to position 8 opens the holding circuit for relay 238 which releases, causing the sequence switch to remain in position 8.

An alarm circuit is associated with the sequence switch in position 8 in order to attract the attention of an attendant. Interrupters 221 and 222 operate at predetermined intervals for connecting ground through relay windings. A circuit is established from battery through the lower contact of cam 210, left winding of relay 233, upper contact of cam 203 to ground at the contact of interrupter 222. This relay locks through its right contact and winding to battery through the lower contact of cam 210. The operation of relay 233 further establishes a circuit through its left contact for the operation of relay 232 which is effective upon a subsequent reverse operation of the interrupter 222. This circuit may be traced from battery through the right winding of relay 232, left contact of relay 233, lower contact of cam 202, to ground at the interrupter. The operation of relay 232 establishes an obvious circuit for the operation of relay 234. The operation of relay 234 establishes a circuit from ground through the alarm bell 267 to the alternating current source 268 for sounding an alarm. The operation of relay 232 further establishes a circuit for lighting lamp 261 from ground through its left outer contact, filament of lamp 261, to battery through the left upper contact of cam 209. The register 231 is operated in position 8 of the sequence switch each time that a double connection is encountered by the testing circuits. This register is merely to record the number of double connections found, during a given number of operations of the test circuit. The circuit for operating register 231 may be traced from battery through the left upper contact of cam 209 winding of register 231, right and left upper contacts of cam 206, to ground through the normal contact of relay 236.

*Restore of test circuit*

The testing circuit may be released at this time by the operation of key 250 which establishes an obvious operating circuit for the relay 235. The operation of relay 235 establishes a locking circuit for itself through its right inner contact to ground through the left lower contact of cam 211. A circuit is also established from ground through the left lower contact of cam 212, right outer contact of relay 235, to battery through the winding of relay 238. The operation of relay 238 establishes circuits to rotate the sequence switch from position 8 to position 10. This circuit may be traced from ground through the right inner contact of relay 238, right lower contact of cam 201, in positions 8 and 9, winding of sequence switch magnet 200, to battery. In position 10 a circuit is established for the downdrive magnet 248, from battery through its winding, left lower contact of cam 205, left lower contact of cam 206, to ground through the left contact of relay 235. The brushes 185 to 189 inclusive, 270 and 271 are restored to their normal position. When the brush 270 is lowered to the position of contact with commutator 272, a circuit is established to energize the sequence switch magnet 200, from ground through brush 270, commutator 272, left lower contact of cam 201, winding of sequence switch magnet 200 to battery. The sequence switch is driven into position 12 over the circuit traced. In position 12 a different circuit is established to rotate the sequence switch into position 14 which circuit may be traced from ground through the left contact of relay 235, left lower contact of cam 206, left upper contact of cam 205, left lower contact of cam 201 to battery through the winding of magnet 200. In position 14 a circuit is established from ground through the normal contact of relay 236, left upper contact of cam 201, to battery through the winding of magnet 200 for rotating the sequence switch into position 15. The sequence switch magnet is now energized through the left lower contact of cam 201, to ground through commutator 272, as previously traced, for rotating the sequence switch cams into position 1. All of the apparatus of the testing circuit is now in its normal position prior to making other tests. If the start key 254 is operated at this time, the sequence switch will be automatically rotated for establishing circuits to drive the switch brushes over the bank contacts.

*No double connections located*

Let it now be assumed that the start key has been actuated and that the sequence switch has rotated into position 4 in the same manner as previously described and that the other apparatus of the circuit has been operated for making a test of the switch bank terminals. If the brushes 185 to 189 are progressively brought into contact with all of the bank terminals without locating any double connections or other unstandard conditions, the top terminal of the bank will be reached without interruption. When the brushes 185 and 189 have advanced slightly above the top terminal, the relays 140 to 144 are released since no condition is present to operate the polarized relays for holding the relays 140 to 144 and brush 271 is brought into contact with an insulated portion of commutator 273. The release of relays 140 to 144 opens the energizing circuit for relay 238 extended through the right inner contacts of these relays. The release of relay 238 opens the energizing circuit for relay 237. Relay 237 is slow to release in order to maintain the circuit established for the updrive magnet for a period of time of sufficient duration to insure the release of relays 140 to 144. This circuit for maintaining the updrive magnet energized is extended from battery through its winding, right lower and upper contacts of cam 205, right contact of relay 237, commutator 274, brush 270 to ground. The release of relay 237 opens the energizing circuit or relay 236. The release of relay 236 establishes a circuit through the left upper contact of cam 201, for rotating the sequence switch into position 7 as previously described. In position 7 a circuit is established to energize relay 238 from ground through brush 270, commutator 274, right upper contact of cam 208, winding of relay 238 to battery. The operation of relay 238 establishes a circuit to advance the sequence switch into position 10 from ground through the right inner contact of relay 238, right lower contact of cam 201, winding of sequence switch magnet 200 to battery. In sequence switch positions 9 and 10 a locking circuit is established for relay 238 through its left inner contact to ground through the left lower contact of cam 213. This relay is locked since the downdrive magnet is energized in this sequence switch position. The holding circuit for relay 238 would therefore be opened as soon as brush 270 moves away from the commutator 274. The circuit for the downdrive magnet may be traced from battery through its winding, left lower and upper contacts of cam 205 to ground through the right inner contact of relay 238. The brushes 185 to 189, 270 and 271 are now lowered to their normal positions. A circuit is now established to rotate the sequence switch to position 12. This circuit may be traced from ground through brush 270, commutator 272, left lower contact of cam 201, to battery through the winding of sequence switch 200. Since relay 235 is normal at this time, the sequence switch remains in position 12.

*Defective resistance test*

In position 12 of the sequence switch the testing circuits are arranged for the organization of a Wheatstone bridge such as shown in Fig. 4. The bridge shown in Fig. 4 is made up of the resistances and relays in the testing circuit with the exception of one leg which is a resistance or direct ground associated with the test terminal. The test to be made with this Wheatstone bridge combination is for ground circuits that are below the resistance value normally used for resistance 110. The resistance values of this bridge are arranged so that the normal resistance 110 used as one leg will accurately balance the bridge in order to have no current flow through the relay 130. Since this test is for ground circuits below the value of the normal resistance 110, the relay 130 is polarized to operate from current in one direction only. If a resistance is encountered above the normal resistance value of 110, there will be a current flow through the polarized relay 130. This current flow will however be in a direction to oppose the operation of the relay. When resistances within certain allowed limits below the normal value of 110 are encountered, the bridge will be unbalanced and a current flow is established through the winding of relay 130 in the proper direction to cause its operation. It is very important that the resistance such as 110 be of the proper value since it controls the potential connected to the test terminal when a connector switch has tested and seized a line for a telephone connection.

For this test a circuit is first established to energize relays 140 to 144 inclusive, from battery through resistance 157, right windings of relays 140 to 144, left upper contact of cam 207, to ground through the left normal contact of relay 235. The operation of relays 140 to 144 establish a circuit for relay 238 from ground through the right lower contact of cam 204, right inner contacts of relays 140 to 144, winding of relay 238 to battery. The operation of relay 238 establishes an operating circuit for relay 237 and the operation of relay 237 establishes an operating circuit for relay 236. A circuit is further established to operate relay 145 for the association of the resistance network and the polarized relay with switch brushes 185 to 189. The operation of relay 238 establishes a circuit to rotate the sequence switch from position 12 to position 14. This circuit may be traced from ground through the right inner contact of relay 238, right lower contact of cam 201, winding of sequence switch magnet 200 to battery. It will be noted that for this test the right hand polarized relays 131, 133, 135, 137 and 139 are eliminated from the bridge circuit by the upper contacts of cams 216 to 220 inclusive.

In sequence switch position 14 a circuit is established for the updrive magnet 247 from battery through its winding, right lower and left upper contacts of cam 205 to ground through the right inner contact of relay 238. The brushes 185 to 189, 270 and 271 are now driven in an upward movement to test the bank terminals for resistance grounds lower than the resistance 110. If a ground resistance of this nature is located by any one of the brushes 185 to 189 inclusive, a polarized relay 130, 132, 134, 136 or 138 will be caused to operate. The polarized relay operates that is connected to the brush associated with the low resistance ground. Relays 140 to 144 inclusive have associated therewith a locking circuit through their left windings and contacts, normal contact of the associated polarized relays 130 to 138, to ground through the contacts of cams 214 and 215. Assuming that polarized relay 136 operates due to an unbalance of the bridge by the associated resistance, the locking circuit for relay 143 would be opened. The relay 143 is thus released which opens the operating circuit for relay 238. The release of relay 238 opens the energizing circuit for relay 237 which releases and opens the energizing circuit for relay 236 which also releases. The release of relay 236 associates an energizing circuit with sequence switch magnet 200 for rotating the sequence switch to position 17. This circuit may be traced from ground through the normal contact of relay 236, left upper contact of cam 201, winding of sequence switch magnet 200 to battery. It will be noted that the holding circuit for relays 140 to 144, excepting the one relay that released, remains established in position 17. This holding circuit is, however, taken directly to sequence switch cams 212, 213, 215 instead of through the back contacts of the polarized relays. Assuming that relay 143 released as described, a circuit for lamp 151 is established which may be traced from battery through the filament of the lamp, to ground through the right upper contact of cam 213. The illumination of this lamp indicates to an attendant the location of the faulty resistance.

In order that the attendant's attention may be attracted to a fault, relays 233 and 232 are operated upon subsequent operation of an interrupter 222 as previously described.

Relay 234 is operated over an obvious circuit which causes the alarm 267 to be sounded. A circuit for lamp 263 is established through the right lower contact of cam 209 which designates that the fault encountered is a low resistance ground.

When an attendant has properly recorded the location of the trouble, the reset key 250 is operated for restoring the circuit and apparatus to normal. The operation of key 250 operates relay 235 over an obvious circuit. The operation of relay 235 establishes a circuit to energize relay 238 from ground through the left lower contact of cam 212, right outer contact of relay 235 to battery through the winding of relay 238. A locking circuit is established for relay 235 through its right inner contact so that the reset key may be released. The operation of relay 238 establishes a circuit to rotate the sequence switch from position 17 to position 18. This circuit may be traced from ground through the right inner contact of relay 238, right lower contact of cam 201 to battery through the winding of sequence switch magnet 200.

Upon the rotation of the sequence switch from position 17 to 18, the energizing circuit for relay 238 is opened to cause its release. Relays 237 and 236 were caused to operate by the operation of relay 238 which had no function at this time. These relays are released upon the release of relay 238. The locking circuits for relays 140 to 144 are also opened. The relays of this group that remained operated are now released. A circuit is now established to energize the downdrive magnet 248 from battery through its winding, left lower contact of cam 205, left upper contact of cam 206, to ground through the normal contact of relay 236. The brushes 185 to 189 inclusive, 270 and 271 are now returned to their normal position. When brush 270 has been lowered to a point where contact is made with commutator 272, a circuit is established to rotate the sequence switch from position 18 to position 1. This circuit may be traced from ground through brush 270, commutator 272, left lower contact of cam 201, to battery through the winding of sequence switch magnet 200. The testing circuit is now in its normal position and may function for other tests.

What is claimed is:

1. In a testing system, a plurality of different electrically connected apparatus, a testing device with a movable contact, a driving means for progressively associating said contact with said plurality of apparatus, a Wheatstone bridge variably formed by said testing device and the apparatus progressively associated with said contact for detecting certain of said electrically connected apparatus, means for operating said driving means, a visual signal for indicating the location of certain apparatus detected, and an audible signal operable in response to certain operations of the apparatus in said Wheatstone bridge.

2. In a testing system, a plurality of electrically connected apparatus, a plurality of testing devices, a common means for progressively associating said testing devices with said apparatus, and a plurality of Wheatstone bridge circuits formed by said testing devices and the apparatus progressively associated therewith variably operable in response to said association.

3. In a testing system, a plurality of electrically connected apparatus, a plurality of testing devices, a common means for progressively associating said testing devices with said apparatus, a plurality of Wheatstone bridge circuits formed by said testing devices and the apparatus progressively associated therewith variably operable in response to said association, means for selecting certain of said apparatus associated with any of said testing circuits, and signaling means for indicating the location of the apparatus selected.

4. In a testing system, a plurality of electrically connected apparatus, a plurality of testing devices, a common means for progressively associating said testing devices with said apparatus, a plurality of Wheatstone bridge circuits formed by said testing devices and the apparatus progressively associated therewith variably operable in response to said association, means for selecting certain of said apparatus associated with any of said testing circuits, means responsive to a selection for arresting the progressive association of said testing devices with said apparatus, and signaling means for indicating the location of the apparatus selected.

5. In a testing system, a plurality of electrically connected apparatus, a plurality of testing devices each having a movable contact connected thereto, a common driving means for associating said contacts progressively with a plurality of said apparatus, a plurality of Wheatstone bridge circuits formed by said testing devices and the apparatus progressively associated with said contracts variably operable in response to said association, and means for operating said driving means.

6. In a testing system, a plurality of lines connected to stationary terminals comprising different electrically connected apparatus, the difference being dependent upon the condition of the line apparatus and the electrical connections thereto, a testing device comprising a movable contact with automatic means for progressively associating said contact with said stationary terminals, and a Wheatstone bridge variably formed by said testing device and the apparatus progressively associated with said contact balanced by the association of said contact with certain electrically connected apparatus, for causing the selection of said certain apparatus.

7. In a testing system, a plurality of lines connected to stationary terminals comprising different electrically connected apparatus, the difference being dependent upon the condition of the line apparatus and the electrical connections thereto, a testing device comprising a movable contact with automatic means for progressively associating said contact with said stationary terminals, a Wheatstone bridge variably formed by said testing device and the apparatus progressively associated with said contact balanced by the association of said contact with certain electrically connected apparatus, for causing the selection of said certain apparatus, and a signal for indicating that said certain apparatus has been selected.

8. In a testing system, a plurality of lines connected to stationary terminals comprising different electrically connected apparatus, the difference being dependent upon the condition of the line apparatus and the electrical connections thereto, a plurality of testing devices comprising a plurality of movable contacts with common means for progressively associating said contacts each with a plurality of said stationary terminals, and a plurality of Wheatstone bridge circuits variably formed by said testing devices and the apparatus progressively associated with each of said contacts, each bridge being operable for causing the selection of certain electrically connected apparatus.

9. In a testing system, a plurality of lines connected to stationary terminals comprising different electrically connected apparatus, the difference being dependent upon the condition of the line apparatus and the electrical connections thereto, a plurality of testing devices comprising a plurality of movable contacts with common means for progressively associating said contacts each with a plurality of said stationary terminals, a plurality of Wheatstone bridge circuits variably formed by said testing devices and the apparatus progressively associated with each of said contacts, each bridge being operable for causing the selection of certain electrically connected apparatus, and signaling means in each testing device for indicating the selection of apparatus associated with its movable contacts.

10. In a testing system, a plurality of lines connected to stationary terminals comprising different electrically connected apparatus, the difference being dependent upon the condition of the line apparatus and the electrical connections thereto, a plurality of testing devices comprising a plurality of movable contacts with common means for progressively associating said contacts each with a plurality of said stationary terminals, a plurality of Wheatstone bridge circuits variably formed by said testing devices and the apparatus progressively associated with each of said contacts, each bridge being operable for causing the selection of certain electrically connected apparatus, means responsive to a selection for arresting the movement of said plurality of contacts, and signaling means for indicating which contact is associated with the apparatus selected.

11. In a testing system, apparatus with standard electrical characteristics, other apparatus with unstandard electrical characteristics, a testing device, automatically operable means for progressively associating said testing device with said apparatus, means for causing the selection of unstandard apparatus and means operable in response to said selection for changing the characterization from unstandard to standard.

12. In a testing system, apparatus with standard electrical characteristics, other apparatus with unstandard electrical characteristics, a testing device, automatically operable means for progressively associating said testing device with said apparatus, a Wheatstone bridge variably formed by said testing device and the apparatus progressively associated therewith, means responsive to certain operations on said Wheatstone bridge for causing the selection of unstandard apparatus and means operable in response to said selection for changing the characterization from unstandard to standard.

13. In a testing system, apparatus with standard electrical characteristics, other apparatus with unstandard electrical characteristics, a plurality of testing devices, automatically operable means for progressively associating said testing devices with said apparatus, means for arresting said progression when any of said testing devices are associated with unstandard apparatus, and means operable in response to the association of any of said testing devices with unstandard apparatus for altering the characterization of said unstandard apparatus to standard.

14. In a testing system, apparatus with standard electrical characteristics, other apparatus with unstandard electrical characteristics, a plurality of testing devices, automatically operable means for progressively associating said testing devices with said apparatus, means for causing the selection of any unstandard apparatus encountered by any said testing devices, means operable in response to said selections for changing the characterization from unstandard to standard, and signaling means for indicating the location of unstandard apparatus selected.

15. In a testing system, apparatus with standard electrical characteristics, other apparatus with unstandard electrical characteristics, a plurality of testing devices, automatically operable means for progressively associating said testing devices with said apparatus, Wheatstone bridge circuits variably formed by said testing devices and the apparatus associated therewith, means responsive to certain operations of said Wheatstone bridge circuits for causing the selection of unstandard apparatus, and means operable in response to said selections for changing the characterization from unstandard to standard.

16. In a testing system, apparatus with standard electrical characteristics, other apparatus with unstandard electrical characteristics, a plurality of testing devices, automatically operable means for progressively associating said testing devices with said apparatus, Wheatstone bridge circuits variably formed by said testing devices and the apparatus associated therewith, means responsive to certain operations of said Wheatstone bridge circuits for causing the selection of unstandard apparatus, means operable in response to said selections for changing the characterization from unstandard to standard, and signaling means for indicating the location of unstandard apparatus selected.

17. In a testing system, a plurality of different electrically connected apparatus connected to stationary contacts, a testing device with a movable contact, a driving means for progressively associating said movable contact with stationary contacts, a Wheatstone bridge variably formed by said testing device and the apparatus progressively associated with said movable contact maintained unbalanced by association with certain apparatus for energizing said driving means and balanced by association with a particular apparatus for deenergizing said driving means.

18. In a testing system, a plurality of different electrically connected apparatus connected to stationary contacts, a testing device with a movable contact, a driving means for progressively associating said movable contact with stationary contacts, a Wheatstone bridge variably formed by said testing device and the apparatus progressively associated with said movable contact maintained unbalanced by association with certain apparatus for energizing said driving means and balanced by association with a particular apparatus for deenergizing said driving means, and a signal operable in response to the balance of said Wheatstone bridge for indicating the location of said particular apparatus.

19. In a testing system, a plurality of different electrically connected apparatus connected to stationary contacts, a testing device with a plurality of movable contacts, a driving means for progressively associating said movable contacts with said stationary contacts, a Wheatstone bridge connected to each movable contact variably formed by said testing device and the apparatus progressively associated with the movable contact individual to each bridge, said bridges being maintained unbalanced by association with certain apparatus for energizing said driving means, and balanced by association with a particular apparatus for deenergizing said driving means.

20. In testing system, a plurality of different electrically connected apparatus connected to stationary contacts, a testing device with a plurality of movable contacts, a driving means for progressively associating said movable contacts with said stationary contacts, a Wheatstone bridge connected to each movable contact variably formed by said testing device and the apparatus progressively associated with the movable contact individual to each bridge, said bridges being maintained unbalanced by association with certain apparatus for energizing said driving means, and balanced by association with a particular apparatus for deenergizing said driving means, and signaling means operable to indicate the particular bridge balanced.

21. In a testing system, a plurality of different electrically connected apparatus connected to stationary contacts, a testing device with a plurality of movable contacts, a driving means for progressively associating said movable contacts with said stationary contacts, a Wheatstone bridge connected to each movable contact variably formed by said testing device and the apparatus progressively associated with the movable contact individual to each bridge for controlling the energization and deenergization of said driving means, the balancing of a bridge associated with a movable contact causing the deenergization of said driving means.

22. In testing system, a plurality of standard and unstandard idle and busy electrically connected apparatus, a testing device automatically operable for making a progressive routine test of the condition of said apparatus comprising a Wheatstone bridge variably changed in formation by the apparatus tested for controlling said routine progression over standard idle and busy apparatus and for locating the position of unstandard apparatus.

23. In a testing system, a plurality of standard and unstandard idle and busy electrically connected apparatus, a testing device automatically operable for making a progressive routine test of the condition of said apparatus comprising a Wheatstone bridge variably changed in formation by the apparatus tested for controlling said routine progression over standard idle and busy apparatus and for locating the position of unstandard apparatus, and for operating signals to indicate the location of unstandard apparatus.

24. In a testing system, a plurality of standard and unstandard idle and busy electrically connected apparatus, a testing device automatically operable for making a progressive routine test of the condition of said apparatus comprising signals, and a Wheatstone bridge variably formed by the standard idle and busy apparatus and the unstandard apparatus associated therewith, for maintaining said bridge unbalanced to control said progression over standard idle and busy apparatus and for balancing said bridge to arrest said progression for operating said signals to indicate the location of unstandard apparatus.

In witness whereof, I hereunto subscribe my name this 17th day of October A. D., 1927.

LEWIS H. JOHNSON.